United States Patent
Morgan et al.

(10) Patent No.: US 12,387,196 B2
(45) Date of Patent: Aug. 12, 2025

(54) MOBILE NAVIGATIONAL CONTROL OF TERMINAL USER INTERFACE

(71) Applicant: NCR Voyix Corporation, Atlanta, GA (US)

(72) Inventors: Kip Morgan, Atlanta, GA (US); Ankit Madhusudan Amin, Snellville, GA (US); Meenakshi Sreeraman, Waxhaw, NC (US); Gina Torcivia Bennett, Lawrenceville, GA (US); Aleah Jean Kadry, Atlanta, GA (US); Zachary Taylor Lasater, Atlanta, GA (US); Jacob Alexander Poston, Loganville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 57 days.

(21) Appl. No.: 17/966,293

(22) Filed: Oct. 14, 2022

(65) Prior Publication Data
US 2023/0029770 A1 Feb. 2, 2023

Related U.S. Application Data

(62) Division of application No. 17/036,074, filed on Sep. 29, 2020.

(51) Int. Cl.
G06Q 20/32 (2012.01)
G06Q 20/20 (2012.01)

(52) U.S. Cl.
CPC ....... *G06Q 20/3276* (2013.01); *G06Q 20/204* (2013.01); *G06Q 20/209* (2013.01); *G06Q 20/322* (2013.01)

(58) Field of Classification Search
CPC . G06Q 20/322; G06Q 20/3276; G06Q 20/204
(Continued)

(56) References Cited

U.S. PATENT DOCUMENTS 7,039,568 B1  5/2006  Dye
9,495,019 B2  11/2016 Ekstrand et al.
(Continued)

FOREIGN PATENT DOCUMENTS

CN  104636917 A  5/2015
CN  108011930 A  5/2018
(Continued)

OTHER PUBLICATIONS

U. B. Ceipidor, C. M. Medaglia, A. Marino, S. Sposato and A. Moroni, "KerNeeS: A protocol for mutual authentication between NFC phones and POS terminals for secure payment transactions," 2012 9th International ISC Conference on Information Security and Cryptology, Tabriz, Iran, 2012, pp. 115-120. (Year: 2012).*
(Continued)

*Primary Examiner* — Virpi H Kanervo
(74) *Attorney, Agent, or Firm* — Schwegman Lundberg & Woessner, P.A.

(57) ABSTRACT

A mobile device establishes an indirect network connection to a User Interface (UI) agent of a terminal. The indirect connection managed as a mobile navigational control session maintained through a server or through the server and a proxy. A keyboard widget/object and a navigation-selection widget/object are rendered within a mobile screen on a display of the mobile device. During the session, a user interacts with the keyboard and/or navigation-selection widgets and corresponding UI key events are forwarded to the UI agent. The UI agent provides the UI key events as Human Interface Device (HID) key events to the terminal causing a transaction interface to update transaction screens being rendered on a transaction display of the terminal during a transaction. The user conducts the transaction at the terminal without touching the transaction display and controls the
(Continued)

transaction screens for the transaction via the keyboard and navigational widgets from the mobile device.

12 Claims, 9 Drawing Sheets

(58) Field of Classification Search
USPC .......................................................... 705/41
See application file for complete search history.

(56) References Cited

U.S. PATENT DOCUMENTS

| | | | |
|---|---|---|---|
| 10,209,960 B1* | 2/2019 | Packes, Jr | G06F 16/9537 |
| 11,068,879 B1 | 7/2021 | Freire | |
| 11,080,669 B1* | 8/2021 | Walker | G06Q 20/02 |
| 11,199,944 B2* | 12/2021 | Randhawa | G06F 3/04817 |
| 11,416,113 B2 | 8/2022 | Kim et al. | |
| 2011/0251910 A1* | 10/2011 | Dimmick | G06Q 20/12 |
| | | | 705/17 |
| 2013/0179507 A1 | 7/2013 | Williams et al. | |
| 2014/0082374 A1 | 3/2014 | Nemazie et al. | |
| 2014/0244409 A1 | 8/2014 | Nathanel et al. | |
| 2020/0067917 A1 | 2/2020 | Mcbain et al. | |
| 2020/0134596 A1* | 4/2020 | Puehse | G06Q 20/3821 |
| 2021/0042743 A1 | 2/2021 | Green et al. | |
| 2021/0318889 A1 | 10/2021 | Waterman | |
| 2021/0326417 A1* | 10/2021 | Cabrera | G06K 7/1417 |
| 2021/0334779 A1 | 10/2021 | Goodwin, III et al. | |

FOREIGN PATENT DOCUMENTS

| | | | | |
|---|---|---|---|---|
| CN | 109871190 A | | 6/2019 | |
| CN | 110856024 A | * | 2/2020 | |
| EP | 3276558 A1 | * | 1/2018 | ............. G06Q 20/32 |
| JP | 2016533093 A | | 10/2016 | |
| KR | 101502821 B1 | | 3/2015 | |
| KR | 20170127649 A | | 11/2017 | |
| RU | 2255371 C2 | | 6/2005 | |
| WO | WO-2012088512 A2 | * | 6/2012 | ........... G06F 21/335 |
| WO | WO-2013040684 A1 | * | 3/2013 | ........... G06Q 20/027 |

OTHER PUBLICATIONS

De Luna, Iviane Ramos, et al. "Mobile payment is not all the same: The adoption of mobile payment systems depending on the technology applied." Technological Forecasting and Social Change 146 (2019): 931-944. (Year: 2019).*

* cited by examiner

MOBILE NAVIGATIONAL CONTROL OF TERMINAL USER INTERFACE

CROSS-REFERENCE TO RELATED APPLICATION

This application is a division of U.S. patent application Ser. No. 17/036,074, filed Sep. 29, 2020, which application and publication is incorporated herein by reference in its entirety.

BACKGROUND

Consumers and employees of organizations have become accustomed to conducting transactions on transaction terminals, such as Self-Service Terminals (SSTs), Automated Teller Machines (ATMs), and cashier-assisted Point-Of-Sale (POS) terminals. Organizations have invested heavily in the transaction interfaces associated with these terminals to ensure transactions are conducted efficiently and without any specialized skill being required of the operators (consumers and/or cashiers/clerks/tellers).

The vast majority of transaction interfaces are provided via touchscreen displays associated with the terminals. However, with the recent world-wide COVID19 virus pandemic consumers and employees are concerned with virus transmission associated with multiple individuals all touching the same display. Employers do periodically disinfect the touchscreen displays, however, it is unrealistic to assume that they can sanitize the displays after each transaction. More likely, the displays are disinfected at the beginning of the day, at the end of the day, and maybe between shifts of employees (depending on customer traffic).

As a result, high-risk COVID19 consumers or employees are rightly concerned about operating the terminals, especially since the transaction interfaces render touch options in the exact same locations of the displays for nearly all transactions, which ensures that everyone is touching a surface that was previously touched by multiple other customers. Moreover, customers/operators may cough or sneeze onto the touchscreen displays while conducting transactions onto the touchscreen displays, such that the health concerns associated with virus transmission are likely exasperated.

Studies have indicated that COVID19 can live on glass screens (which is the touch surface of terminals) for up to 96 hours.

SUMMARY

In various embodiments, methods and a system for mobile navigational control of transaction terminal User Interfaces (UIs) are presented.

According to an embodiment, a method for mobile navigational control of a terminal's UI is provided. For example, a remote-control user session is established that allows control of a transaction interface processing on a transaction terminal by a mobile device during a transaction. User interface (UI) that are generated by the mobile device are received during the remote-control user session. The UI events are provided as Human Interface Device (HID) events for a HID type supported by the transaction interface to the transaction terminal causing the transaction interface to update UI screens on a display of the transaction terminal based on the HID events during the remote-control user session.

DETAILED DESCRIPTION

Figure 1A:
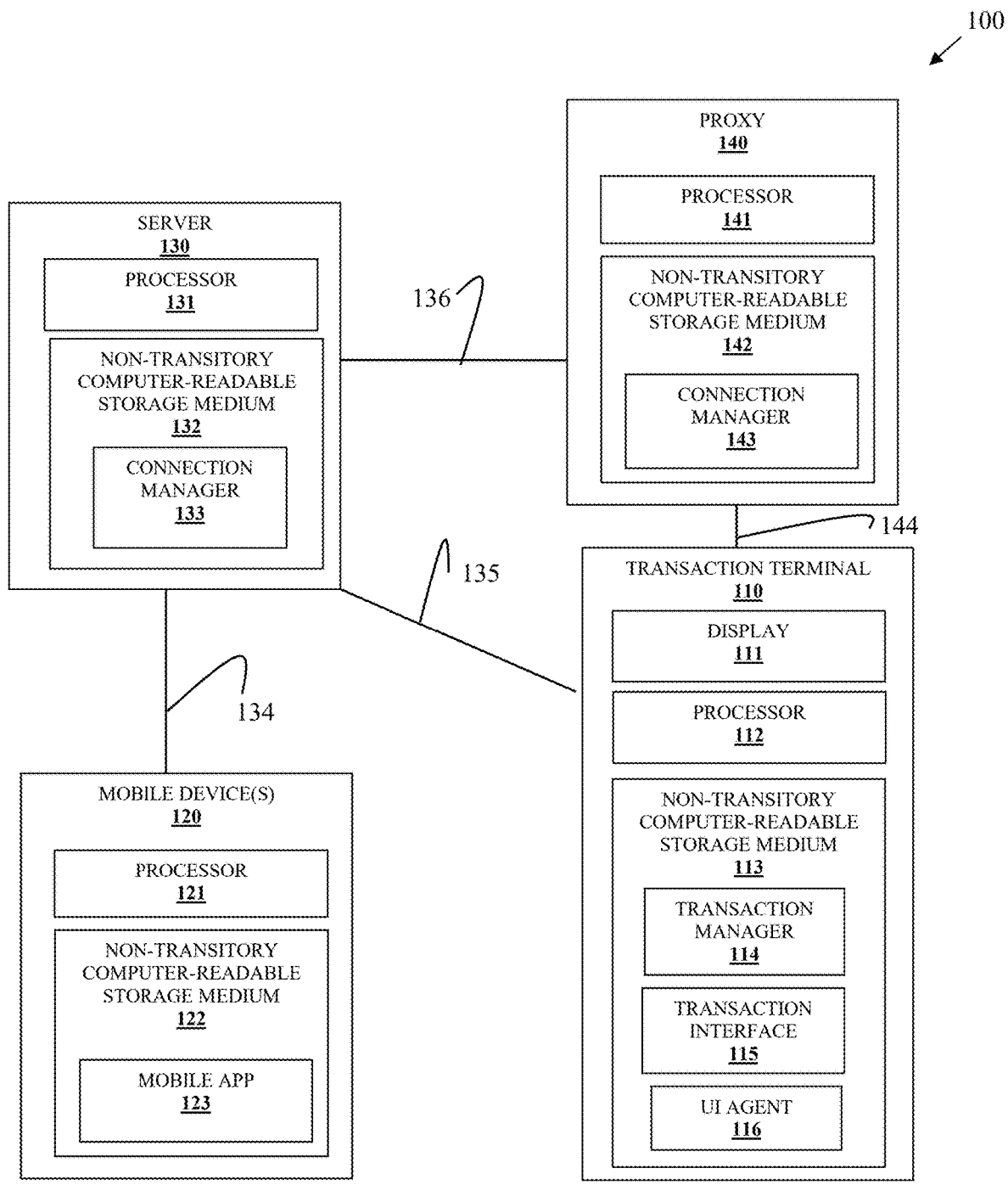
FIG. 1A is a diagram of a system for mobile navigational control of a terminal's UI, according to an example embodiment.

FIG. 1A is a diagram of a system 100 for mobile navigational control of a terminal's UI, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of mobile navigational control of a terminal's UI, presented herein and below.

As will be discussed herein and below, methods and a system are provided for allowing a mobile device to obtain remote navigational control of a transaction terminal's UI during a transaction at the terminal. This is achieved without the mobile device having a direct network connection to the terminal; rather, the connection is provided by a server that interacts with the mobile device and the terminal. Additionally, in situations where the terminal lacks a Wide-Area Network (WAN) connection (such as an Internet connection) due to security concerns, the connection is provided through the server and a proxy device that is locally connected to the terminal over a Local-Area Network (LAN), the proxy device has a WAN connection for interaction with the server (e.g., the terminal has a LAN connection to a local proxy device and the local proxy device has WAN connection to the server). An agent process on the terminal that simulates hardware associated with a Human Interface Device (HID) for which there is already a driver available on the terminal (HID type is terminal supported), such that minimal software changes are needed on the terminal because the mobile device commands are simulated as an existing HID type already recognized on the terminal (such as a keyboard HID). This means the techniques are usable across a wide range of computer devices and terminals, with a single agent process.

System 100 includes a transaction terminal 110, a mobile device 120, a server 130, and optionally, a proxy device (proxy) 140.

Terminal 110 comprises a touch display 111, a processor 112, and a non-transitory computer-readable storage medium 113. Medium 113 comprises executable instructions for a transaction manager 114, a transaction interface 115, and a UI agent 116.

Each mobile device 120 comprises a processor 121 and a non-transitory computer-readable storage medium 122. Medium 122 comprises executable instructions for a mobile application (app) 123.

Server 130 comprises a processor 131 and a non-transitory computer-readable storage medium 132. Medium 132 comprises executable instructions for a connection manager 133.

Optional proxy 140 comprises a processor 141 and a non-transitory computer-readable storage medium 142. Medium 142 comprises executable instructions for a mobile application (app) 143.

Each corresponding processor of each corresponding device obtains the corresponding executable instructions from the corresponding mediums, which causes the corresponding processor to perform operations described herein and below for 113-116, 123, 133, and 143.

Mobile navigational control of the transaction interface 114 proceeds in a manners discussed in the embodiments that follow.

Initially, a customer/user/operator approaches a transaction terminal 110 to perform a transaction. A transaction splash screen 115B (shown in FIG. 1C) is rendered by transaction UI 115 onto display 111 of terminal 110. The splash screen 115 includes a novel QR code 115A (shown in FIG. 1B) located within screen 115 that is encoded with a Uniform Resource Locator (URL) address of server 130 (shown adjacent to QR code 115A in FIG. 1B), a vendor identifier (associated with the specific retailer where terminal 110 is being operated), and lane or terminal identifier for terminal 110. Splash screen 115B also renders adjacent to QR code 115A text instructions indicating to the user that scanning of the QR code 115A will allow the user to begin a transaction at terminal 110 by using the user's mobile device 120 to remotely control and interact with transaction UI 115.

In an embodiment, if the user is using the mobile navigational control of terminal UI features for a first time, connection manager 133 of server 130 causes mobile app 123 to be downloaded and installed on mobile device 120.

In an embodiment, the user downloads app 123 from an app store.

In an embodiment, the user has previously downloaded and used app 123 before QR code 115A is scanned from splash screen 115B.

In an embodiment, the mobile app 123 is processed via a web browser and web-pages hosted by server 130. The web browser may include a plugin that is locally processed on the mobile device 120 from within the web browser.

Figure 1B:
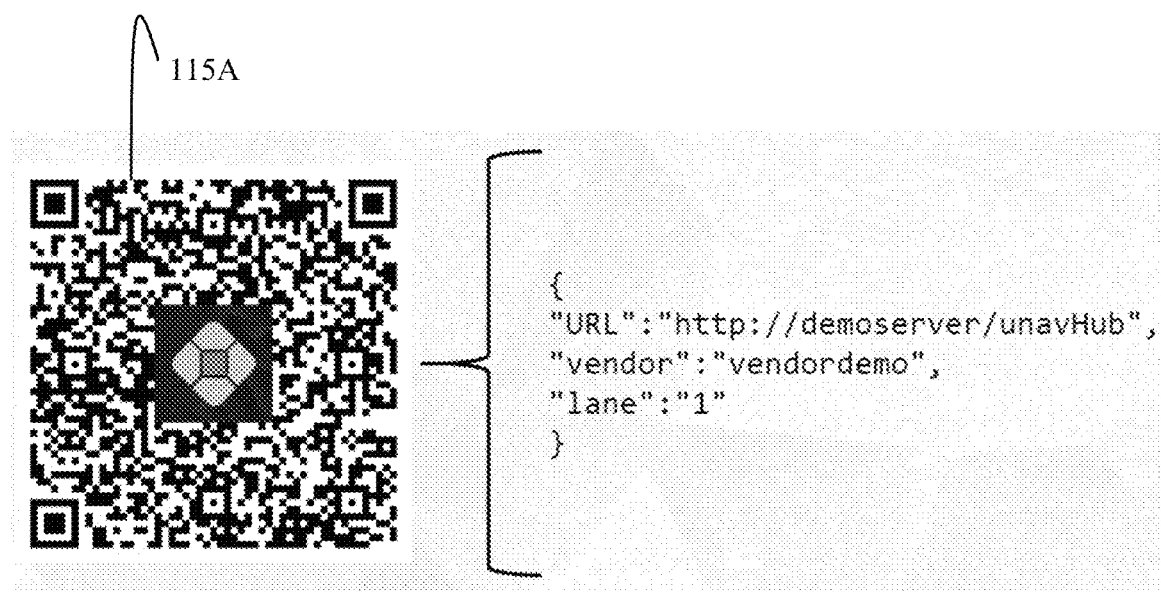
FIG. 1B is a diagram of Quick Response (QR) code that initiates a mobile device navigational control session with a terminal, according to an example embodiment.

Scanning of QR code 115A, causes app 123 to connect to connection manager 133 at the server address encoded in QR code 115B and further causes app 123 to provide to connection manager the mobile device's identifier along with the vendor identifier and the lane/terminal identifier (the vendor identifier and lane/terminal identifier are embedded within the URL as parameters to server address (connection manager 133) (as shown in FIG. 1B)).

Receipt of the mobile device identifier, vendor identifier, and lane/terminal identifier by connection manager 133, indicates a mobile navigational control session request is being received from mobile device 120 (based on mobile device identifier) for a mobile device controlled transaction with terminal 110 (based on lane/terminal identifier) at a specific retailer or retailer location (based on vendor identifier).

Each terminal of a specific retailer or a specific retailer location is uniquely resolved by the combination of vendor identifier and terminal identifier. For example, a vendor identifier may be a unique label or number string that is specific to a retailer or specific to a retailer location (store). In FIG. 1B the vender identifier embedded in the URL is identified as "vendordemo." The lane/terminal identifier is unique within the context of the vendor identifier. In FIG. 1, the lane/terminal identifier embedded in the URL is identified as "1." The combination of vendor identifier with lane/terminal identifier provides uniqueness to a specific terminal 110 from which the URL was received by connection manager 133.

Connection manager 133 first checks to see whether or not there is already a mobile navigational control session being processed at the terminal 110 using the vendor identifier and terminal identifier. If a session is already active on terminal 110, then connection manager 133 causes mobile app 123 to render an error message popup screen 123D on a display of mobile device (connection error message popup screen 123D illustrated in FIG. 1G), which indicates that the connection is terminated as the terminal 110 is already in use for a transaction.

Assuming, that there is not an already existing transaction in progress at terminal 110, connection manager 133 establishes a connection between mobile app 123 and UI agent 116 in two different manners. Once a connection is established, the mobile app 123 of mobile device 120 has established a mobile navigational control session with UI agent 116 of terminal 110 for a transaction.

The connection is indirect meaning that the mobile navigational control session (session) is maintained and routed: 1) through server 130 (via connection 134 between mobile device 120 and server 130) to terminal 110 (via connection 135 between server 130 and terminal 110) or 2) through server 130 (via connection 134 between mobile device 120 and server 130) to proxy 140 (via connection 136 between server 130 and proxy 140) and further from proxy 140 to terminal 110 (via connection 144 between proxy 140 and terminal 110).

The first connection technique is used when terminal 110 has a direct WAN connection for access to server 130. In this case, the session is maintained, managed, and routed through WAN connection 134 to WAN connection 135 (mobile device 120 to server 130 and from server 130 to terminal 110).

The second connection technique is used when terminal 110 lacks a direct WAN connection for access to server 130 but maintains a LAN connection to proxy 140 and proxy 140 has a WAN connection to server 130. In this case, the session is maintained, managed, and routed through WAN connection 134 to WAN connection 136 and further to LAN connection 144 (mobile device 120 to server 130 and from server 130 to proxy 140 and further from proxy 140 to terminal 110).

Connection manager 133 may maintain an in-memory table (or any other mapping technique) that is based on vendor identifier-terminal identifier combination and that indicates whether the first connection technique (connections 134 and 135) are being used for terminal 110 or whether the second connection technique (connections 134, 136, and 144) are being used for terminal 110. In an embodiment, when terminal 110 is booted and/or has a network connection UI agent 116 reports directly to connection manager 133 over 135 for the first connection technique or the UI agent 116 reports indirectly to connection manager 133 for the second connection technique over 144 and using connection manager 143 over further connection 136 to connection manager 133.

During a mobile navigational control session that is successfully established, messages are relayed between app 123 to UI agent 116 along a network path. For the first connection technique, the message path is from app 123 to connection manager 133 and from connection manager 133 to UI agent 116 (the same path is traversed in reverse order for messages originating with UI agent 116 to app 123). For the second connection technique, the message path is from app 123 to connection manager 133, from connection manager 133 to connection manager 143, and from connection manager 143 to UI agent 116 (the same path is traversed in reverse order for messages originating from UI agent 116 to app 123).

In an embodiment, messages sent between mobile app 123 and UI agent 116 are keyboard events and selections (enter key on a keyboard).

In an embodiment, navigation events between UI objects (options) being rendered by transaction interface 115 (based on interactions with transaction manager 114) comprise arrow key events for arrow keys that are already available on standard keyboards. The arrow keys allow for navigating objects of transaction UI 115 translate into bringing particular objects into focus for potential selection, which is visualized by highlighting a given object within a given transaction UI rendered screen.

Figure 1C:
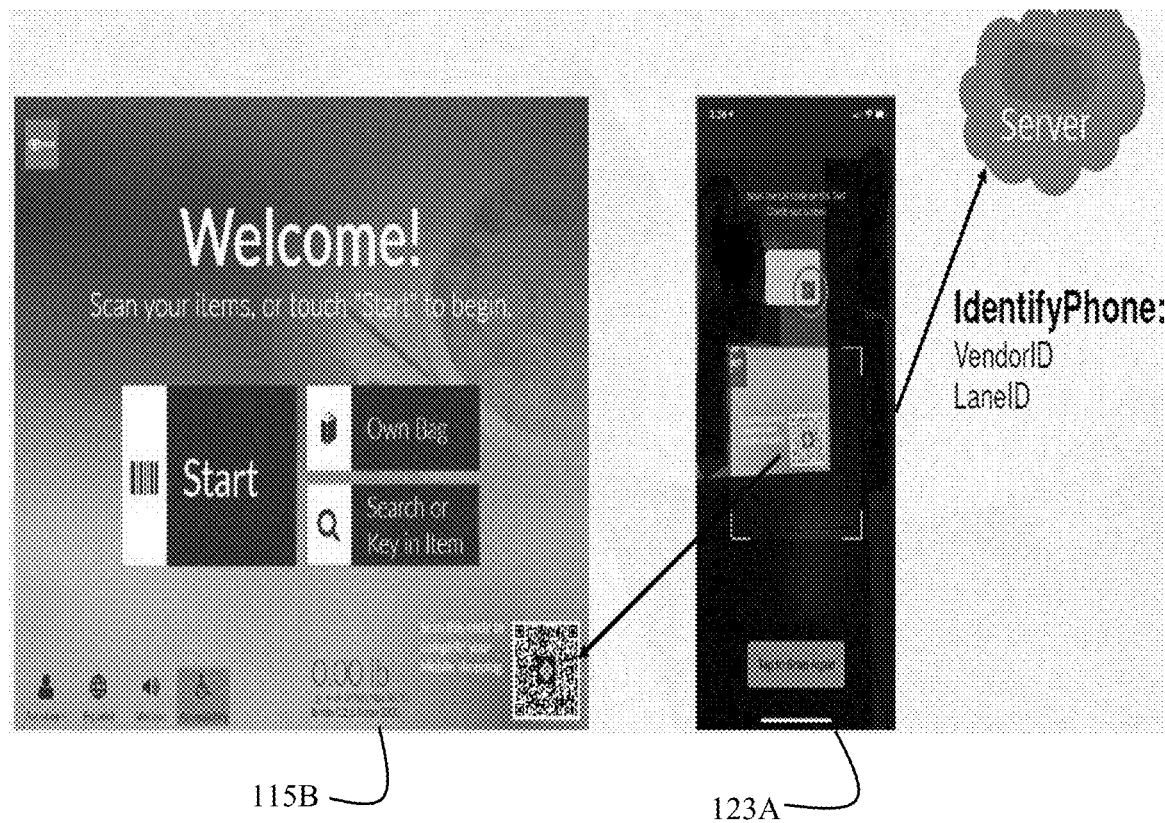
FIG. 1C is a diagram of screens rendered during initiation of a mobile device navigational control session on the terminal and the mobile device, according to an example embodiment.
Figure 1D:
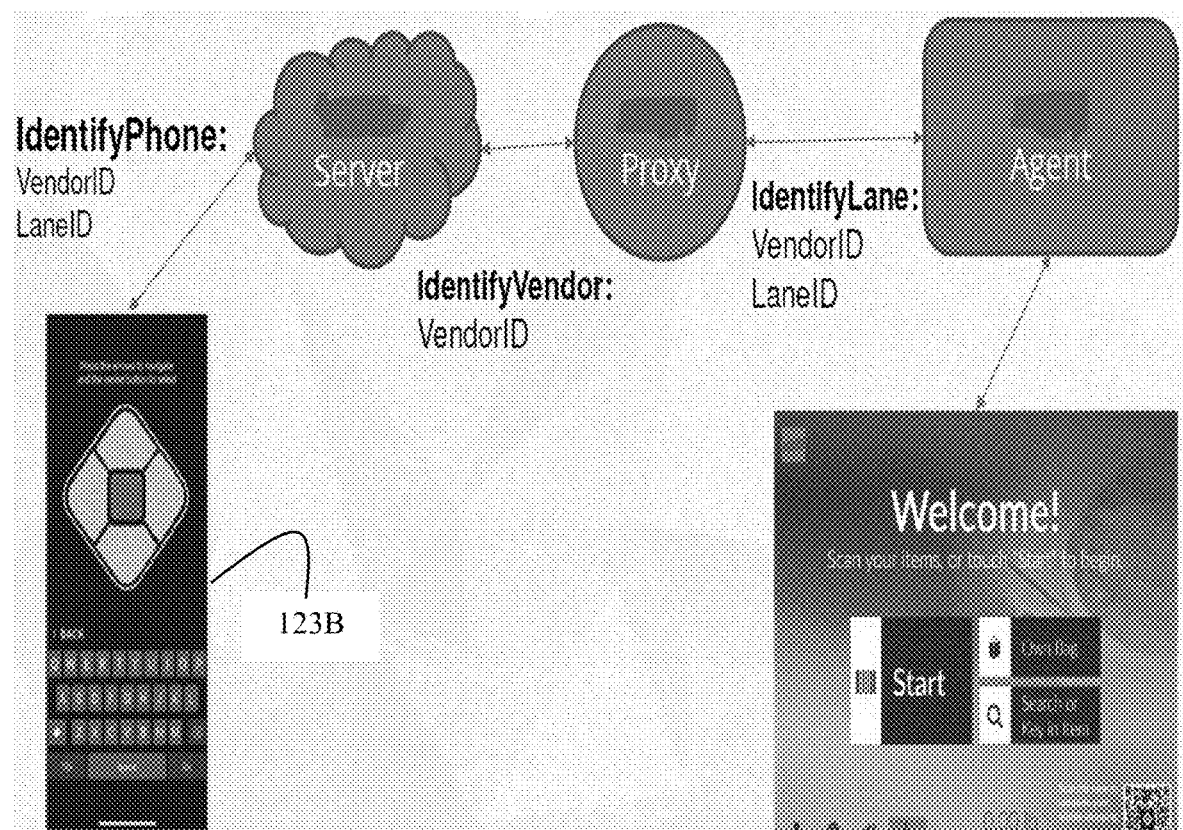
FIG. 1D is a diagram depicting a mobile device screen and transaction screen along with a process flow for mobile device navigational session initiation, according to an example embodiment.
Figure 1E:
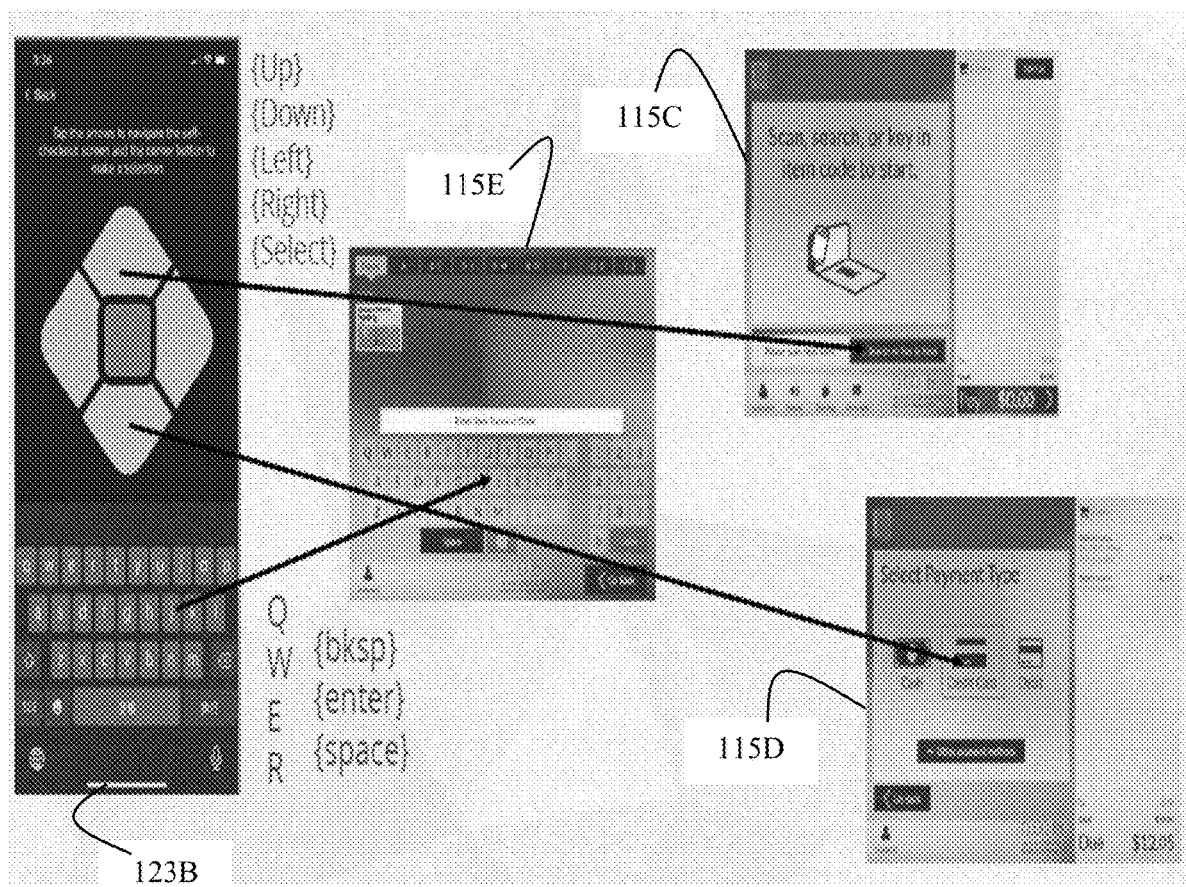
FIG. 1E is a diagram is a diagram of mobile device screens and terminal screens rendered during the mobile device navigational control session, according to an example embodiment.

Mobile app 123 renders a screen with a navigation-selection widget/object along with a keyboard on the display of mobile device 120 (shown in screen 123B of FIG. 1D). The user touches the up, down, left, right, a center portion of the navigation-selection widget/object or a key of the keyboard within the screen, app 123 sends the event over the corresponding connection technique to UI agent 116. UI agent 116 provides the event as a keyboard event for an arrow key event, key entry event, or selection key event to transaction interface 115, which identifies it as coming from a keyboard entry on terminal 110 during a transaction. This causes transaction interface 115 to update what is highlighted or brought into focus on a transaction interface rendered screen for arrow key events (navigation) or causes transaction interface 115 to update or change information displayed within a given screen or render a new screen based on a selection event (enter key from keyboard or center of widget) as shown in FIG. 1E with keyboard events identified by the arrows within mobile device rendered screen 123B causing transaction UI 115 to update or navigate with changes in rendered screens 115C, 115D, and 115E. Screen 115E illustrates that touches of a user within mobile device rendered screen 123B on keys causes transaction UI to map directly the touched keys in transaction UI screen 115E—this is useful for item searching or manual entry of text being required by transaction manager 114 during a transaction on terminal 110.

UI agent 116 simulates the actual physical hardware associated with a keyboard of terminal 110, such that no software changes are needed by transaction UI 115 to achieve the mobile control of the transaction UI 115 by the user operating app 123. In fact, the only modification to an existing transaction UI to perform mobile control of transaction UI 115 is the addition of UI agent 116 and displaying of the QR code 115A on splash screen 115B because UI agent 116 presents as an actual keyboard HID of terminal 110.

Existing terminals having existing transaction interfaces with touch displays supporting standard keyboard events for their UIs. So, keyboard events and selections are associated with a keyboard HID of the existing terminals already, which means that the message passing for navigation control requires very little integration with existing terminals other than splash screen 115B to add QR code 115A and UI agent 116 on terminal 110.

The mobile control of transaction UI 115 permits transaction processing with transaction manager 114 by a user without the user ever having to touch display 111. This is particularly beneficial during the COVID19 pandemic to ensure the health safety of operators of terminals 110 during transaction processing. The virus spreads through touch surfaces and by not touching display 111, customers and staff that operate terminals 110 eliminate one mode of virus transaction while conducting transaction checkouts at a retail store.

FIG. 1B is a diagram of QR code 115A that initiates a mobile device navigational control session with a terminal, according to an example embodiment. The QR code 115A is encoded with an address to connect to server 130 and further encoded with a vender identifier for a vendor and a terminal identifier for a terminal of that vendor. The address, vendor identifier, and terminal identifier are formatted within an URL for automated processing by mobile device 120 to obtain app 123 or by app 123 when app 123 is already installed on device 120.

FIG. 1C is a diagram of screens rendered during initiation of a mobile device navigational control session on the terminal (splash screen 115B) and the mobile device (123A), according to an example embodiment.

FIG. 1C illustrates an initial splash screen 123A of app 123 for capturing QR code 115A from splash screen 115B of transaction UI 115. Capturing of QR cod 115A causes app 123 to automatically contact connection app 133 of server 130 with mobile device identifier, vendor identifier, and lane/terminal identifier for terminal 110.

FIG. 1D is a diagram depicting a mobile device screen and transaction screen along with a process flow for mobile device navigational session initiation, according to an example embodiment.

FIG. 1D illustrates the second connection technique and an initial mobile navigational control session rendered screen 123B provided by app 123 on mobile device 120, which is synchronized by UI agent 116 for navigation and selection within the splash screen 115B rendered by transaction UI 115 on display 111 of terminal 110.

FIG. 1E is a diagram is a diagram of mobile device screens and terminal screens rendered during the mobile device navigational control session, according to an example embodiment.

FIG. 1E illustrates three touches from a single rendered app screen 123B during a mobile navigational control session, which controls and causes transaction UI 115 to update screens 115C, 115D, and 115E based on keyboard message events relayed from app 123 to UI agent 116 during a transaction. Screen 123 includes a widget (diamond shaped object displayed on the center of screen 123) corresponding to 5 standard keyboard keys for up arrow, down arrow, left arrow, right arrow, and enter (can also be a space key (instead of the enter key), which is used for selection by a given transaction UI 115).

Figure 1F:
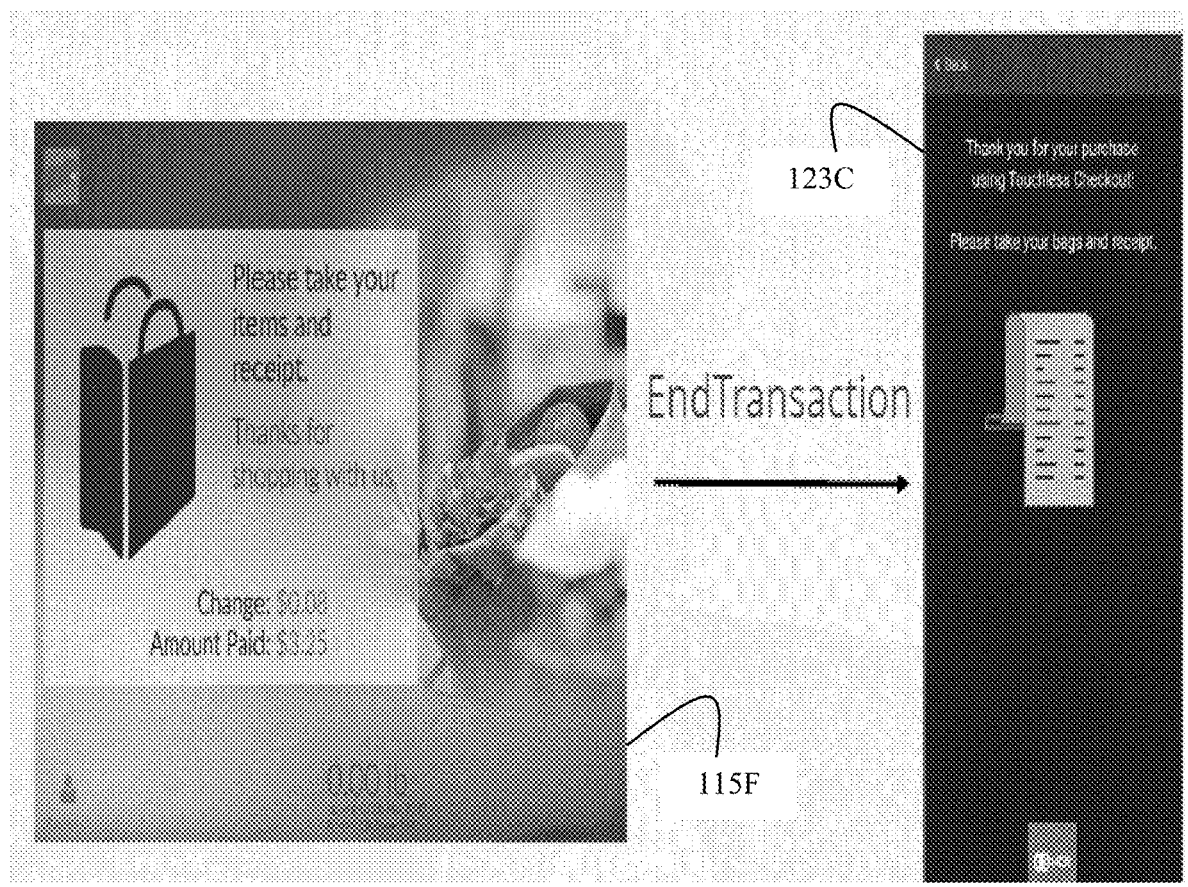
FIG. 1F is a diagram of a terminal screen and a mobile device screen at terminal of a mobile device navigational control session, according to an example embodiment.

FIG. 1F is a diagram of a terminal screen and a mobile device screen at terminal of a mobile device navigational control session, according to an example embodiment.

FIG. 1F illustrates a final transaction UI rendered screen 115F generated after payment for a transaction is confirmed as received by transaction manager 114. UI agent 116 forwards an end of transaction event to app 123, this causes app 123 to render a take your receipt-transaction complete screen 123C on the display of mobile device 120 to the user.

Figure 1G:
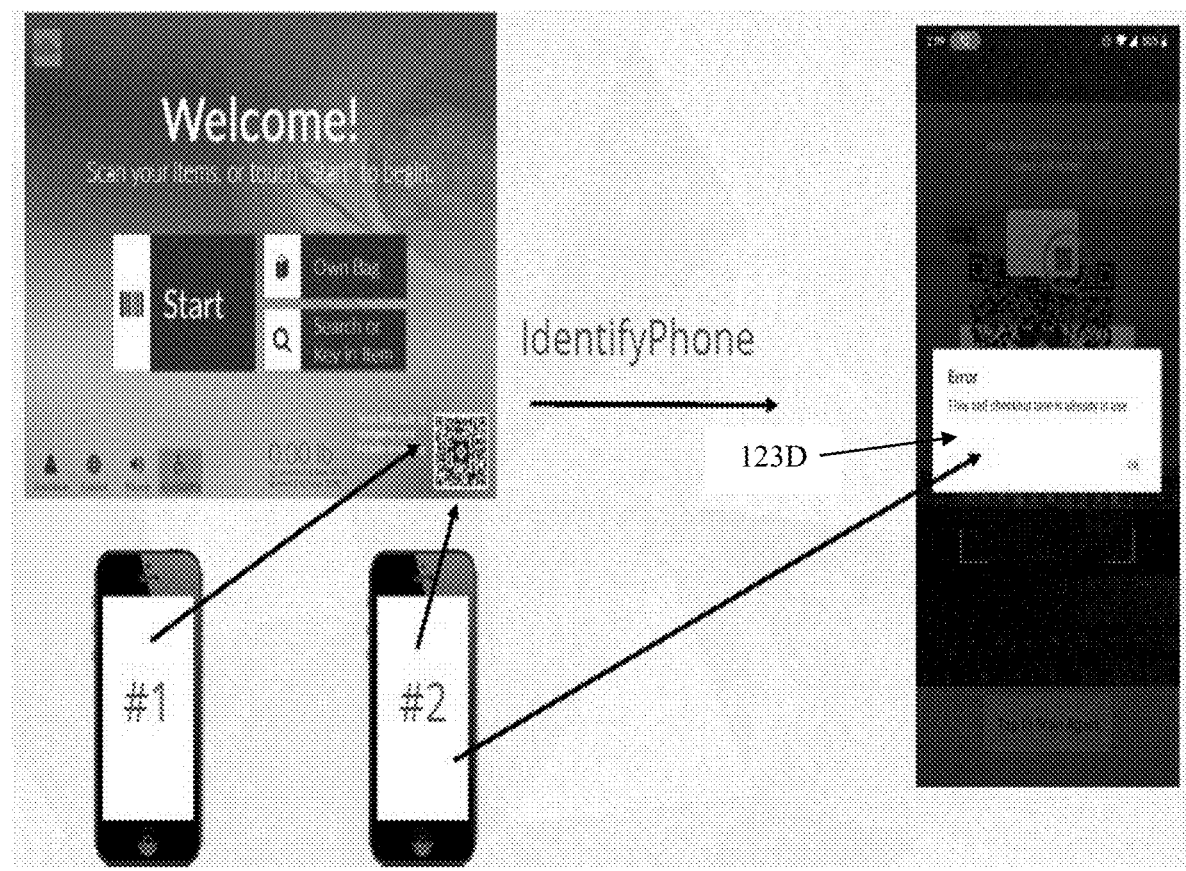
FIG. 1G is a diagram that illustrates security processing to ensure a single mobile device is able to engage in a single navigational control session along with an error screen rendered on a second device that attempted to join or initiate a mobile device navigational control session when an existing session was already established, according to an example embodiment.

FIG. 1G is a diagram that illustrates security processing to ensure a single mobile device is able to engage in a single navigational control session along with an error screen rendered on a second device that attempted to join or initiate a mobile device navigational control session when an existing session was already established, according to an example embodiment.

FIG. 1G illustrates a splash screen 115B associated with an already established mobile navigational control session between mobile device #1 and terminal 110, where a second mobile device #1 scans the QR code 115A thereafter. This causes connection manager 133 to send a terminate connection event to app 123 of device #2. App 123 of device #2 generates a popup error message screen 123D indicating that terminal 110 is already in use and the mobile navigation control session could not be established.

In an embodiment, terminal 110 is an Automated Teller Machine (ATM), a Point-Of-Sale (POS) terminal, a Self-Service Terminal (SST), or a kiosk.

In an embodiment, mobile device 120 is a phone, a tablet, a laptop, or a wearable processing device.

In an embodiment, server 130 is one of multiple servers that logically cooperated as a cloud processing environment (cloud). The cloud delivering the mobile control of transaction UI 115 during transactions at terminal 110 to mobile device 120 and terminal 110 via the cloud.

Figure 2:
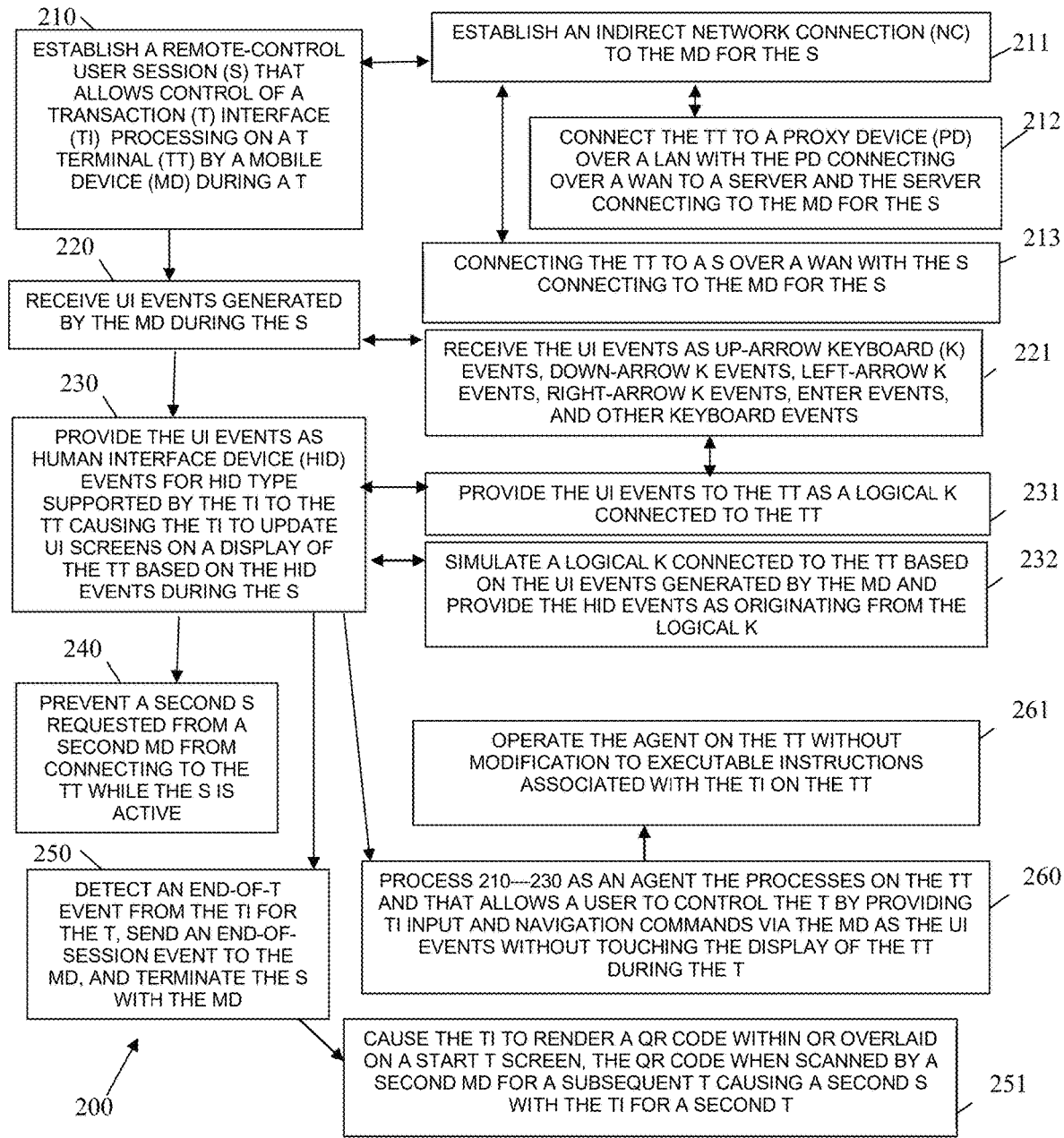
FIG. 2 is a diagram of a method for mobile navigational control of a terminal's UI, according to an example embodiment.

The above-noted embodiments and other embodiments are now discussed with FIG. 2.

FIG. 2 is a diagram of a method 200 for mobile navigational control of a terminal's UI, according to an example embodiment. The software module(s) that implements the method 200 is referred to as a "remote transaction terminal UI agent." The remote transaction terminal UI agent is implemented as executable instructions programmed and residing within memory and/or a non-transitory computer-readable (processor-readable) storage medium and executed by one or more processors of a transaction terminal. The processor(s) of the device that executes the remote transaction terminal UI agent are specifically configured and programmed to process the remote transaction terminal UI agent. The remote transaction terminal UI agent may have access to one or more network connections during its processing. The network connections can be wired, wireless, or a combination of wired and wireless.

In an embodiment, the remote transaction terminal UI agent executes on transaction terminal 110. In an embodiment, the terminal 110 is a POS terminal, a SST, an ATM, a kiosk, or a gaming terminal.

In an embodiment, the remote transaction terminal UI agent is transaction UI 116.

At 210, the remote transaction terminal UI agent establishes or initiates a remote-control user session that allows control of a transaction interface, which is processing on a transaction terminal, by a mobile device during a transaction.

In an embodiment, at 211, the remote transaction terminal UI agent establishes an indirect network connection to the mobile device for the remote-control user session.

In an embodiment of 211 and at 212, the remote transaction terminal UI agent connects to the transaction terminal to a proxy device over a LAN with the proxy device connecting over a WAN to a server and the server connecting to the mobile device for the remote-control user session.

In an embodiment of 211 and at 213, the remote transaction terminal UI agent connects to the transaction to a server over a WAN with the server connecting to the mobile device for the remote-control user session.

At 220, the remote transaction terminal UI agent receives UI events generated by the mobile device during the remote-control user session.

In an embodiment, of 221, the remote transaction terminal UI agent receives the UI events as up-arrow keyboard events, down-arrow keyboard events, left-arrow keyboard events, right-arrow keyboard events, enter events, and other keyboard events.

At 230, the remote transaction terminal UI agent provides the UI events as HID events for a HID type supported by the transaction interface to the transaction terminal causing the transaction interface to update UI screens on a display of the transaction terminal based on the HID events during the remote-control user session.

In an embodiment, at 231, the remote transaction terminal UI agent provides the UI events to the transaction terminal as a logical keyboard connected or interfaced to the transaction terminal.

In an embodiment, at 232, the remote transaction terminal UI agent simulates a logical keyboard connected or interfaced to the transaction terminal based on the UI events generated by the mobile device and the remote transaction terminal UI agent provides the HID events as originating from the logical keyboard.

In an embodiment, at 240, the remote transaction terminal UI agent prevents a second remote-control user session requested from a second mobile device from connecting to the transaction terminal while the remote-control user session is active with the transaction terminal.

In an embodiment, at 250, the remote transaction terminal UI agent detects and end-of-transaction event from the transaction interface for the transaction and in response thereto, the remote transaction terminal UI agent sends an end-of-session event to the mobile device. The remote transaction terminal UI agent then terminates the remote-control user session with the mobile device.

In an embodiment of 250 and at 251, the remote transaction terminal UI agent causes the transaction interface to render a QR code within or overlaid on a start transaction screen. The QR code when scanned by a second mobile device for a subsequent transaction causes a second remote-control user session to be established with the transaction interface for a second transaction.

In an embodiment, at 260, the remote transaction terminal UI agent performs the processing of 210-230 as an agent that processes on the transaction terminal and that allows a user to control the transaction by providing transaction interface input and navigation commands via the mobile device as the UI events without touching the display of the transaction terminal during the transaction.

In an embodiment of 260 and at 261, the remote transaction terminal UI agent is operated on the transaction terminal without requiring modification to a source code or executable instructions associated with the transaction interface on the transaction terminal.

Figure 3:
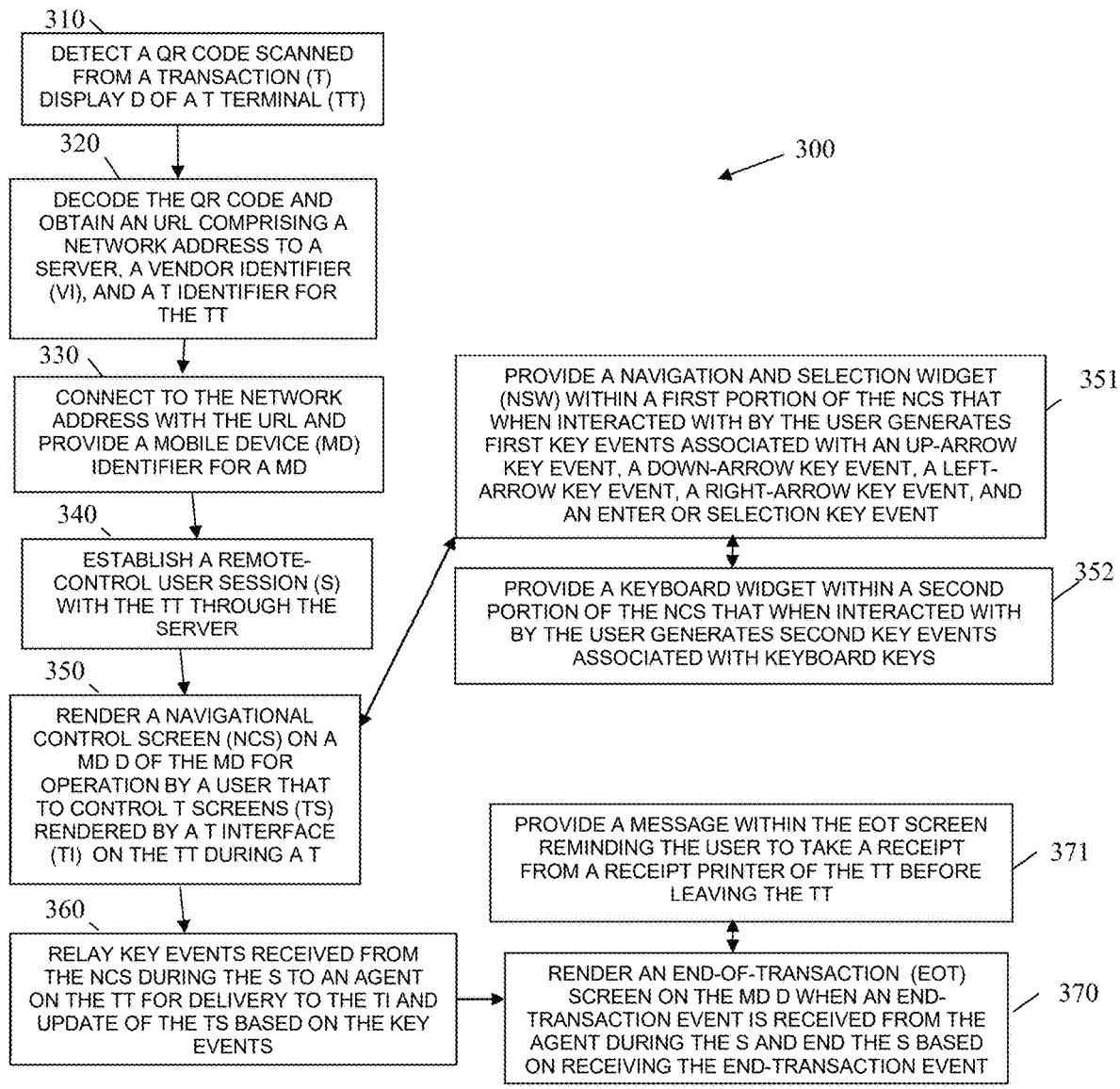
FIG. 3 is a diagram of another method for mobile navigational control of a terminal's UI, according to an example embodiment.

FIG. 3 is a diagram of a method 300 for mobile navigational control of a terminal's UI, according to an example embodiment. The software module(s) that implements the method 300 is referred to as a "transaction UI control app." The transaction UI control app is implemented as executable instructions programmed and residing within memory and/or a non-transitory computer-readable (processor-readable) storage medium and executed by one or more processors of a mobile device. The processor(s) of the device that executes the transaction UI control app are specifically configured and programmed to process the transaction UI control app. The transaction UI control app may have access to one or more network connections during its processing. The network connections can be wired, wireless, or a combination of wired and wireless.

In an embodiment, the mobile device that executes the transaction UI control app is mobile device 120. In an embodiment, the mobile device 120 is a phone, a tablet, a laptop, or a wearable processing device.

In an embodiment, the transaction UI control app is app 123.

Transaction UI control app interacts with UI agent 116 and/or method 200 indirectly over a network for purposes of navigating and controlling transaction UI 115 during a transaction at a transaction terminal 110.

At 310, the transaction UI control app detects a QR code scanned from a transaction display of a transaction terminal.

At 320, the transaction UI control app decodes the QR code and obtains an URL comprising a network address to a server, a vendor identifier for a vendor, and a terminal identifier for the transaction terminal.

At 330, the transaction UI control app connects to the network address with the URL and provides a mobile device identifier for the mobile device that is executing the transaction UI control app.

At 340, the transaction UI control app establishes a remote-control user session with the transaction terminal through the server.

At 350, the transaction UI control app renders a navigational control screen (such as the diamond shaped object shown in screen 123B) on a mobile device display of the mobile device for operation/interaction by a user to control transaction screens rendered by a transaction interface on a transaction terminal display of the transaction terminal during a transaction by the user at the transaction terminal.

In an embodiment, at 351, the transaction UI control app provides a navigation and selection widget within a first portion of the navigation control screen that when interacted with (touched) by the user generates first key events associated with an up-arrow key event, a down-arrow key event, a left-arrow key event, a right-arrow key event, and an enter or selection key event (see diamond-shaped widget within top half of screen 123B).

In an embodiment of 351 and at 352, the transaction UI control app provides a keyboard widget for keyboard keys within a second portion of the navigational control screen that when interacted with (touched) by the user generates second key events associated with keyboard keys (see rendered keyboard within bottom half of screen 123B).

At 360, the transaction UI control app relays key events received from the navigational control screen during the remote-control user session to an agent on the transaction terminal for delivery to the transaction interface and update of the transaction screens on the transaction display based on the key events.

In an embodiment, at 370, the transaction UI control app renders an end-of-transaction screen on the mobile device display when an end-transaction event is received from the agent during the remote-control session. The transaction UI control app then ends the remote-control user session based on receiving the end-transaction event.

In an embodiment of 370 and at 371, the transaction UI control app provides a message within the end-of-transaction screen reminding the user to take a receipt from a receipt printer of the transaction terminal before leaving the transaction terminal.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
scanning, by a mobile device comprising a processor and a display, a quick response (QR) code from a transaction display of a payment transaction terminal;
decoding, by the processor, the QR code;
obtaining, by the processor, a uniform resource locator (URL) comprising a network address to a server, a vendor identification, and a transaction terminal identifier for the payment transaction terminal from a decoded QR code;
establishing, by the processor, a remote-control user session with the payment transaction terminal by connecting the mobile device to the network address with the URL and providing a mobile device identifier to the server;
rendering a navigational control screen on the display of the mobile device for operation by a user to control transaction screens rendered by a transaction interface on the payment transaction terminal during a payment transaction;

controlling, by the processor via a navigational control screen of the display of the mobile device, the transaction screens generated on the payment transaction terminal during the remote-control user session by:

relaying key payment events generated by the user of the mobile device received from the navigational control screen of the mobile device during the user making the payment transaction to a user interface (UI) agent on the payment transaction terminal for delivery to the transaction interface;

updating the transaction screens based on the key payment events, wherein the UI agent simulates a logical keyboard connected to the payment transaction terminal based on the key payment events generated by the user of the mobile device, wherein the UI agent simulates physical hardware associated with a keyboard of the payment transaction terminal, and wherein the UI agent operates on the payment transaction terminal without modification to executable instructions associated with the transaction interface on the payment transaction terminal; and preventing a second remote-control user session that is requested from a second mobile device from connecting to the payment transaction terminal; and receiving, by the processor, a payment completed message from the UI agent after the UI agent completes the payment transaction based on the key payment events generated by the user of the mobile device.

2. The method of claim 1, further comprising:
rendering an end-of-transaction screen on the display of the mobile device when an end-transaction event is received from the UI agent during the remote-control user session; and ending the remote-control user session based on receiving the end-transaction event.

3. The method of claim 2, wherein rendering the end-of-transaction screen further comprises providing a message within the end-of-transaction screen reminding the user to take a receipt from a receipt printer of the payment transaction terminal before leaving the payment transaction terminal.

4. The method of claim 1, wherein the navigational control screen further comprises a navigation and selection widget within a first portion of the navigational control screen that when interacted with by the user generates key payment events associated with an up-arrow key event, a down-arrow key event, a left-arrow key event, a right-arrow key event, and an enter or selection key event.

5. The method of claim 4, wherein the navigational control screen further comprises a keyboard widget within a second portion of the navigational control screen that when interacted with by the user generates key payment events associated with keyboard keys.

6. The method of claim 1, wherein the navigational control screen is received from the server, and wherein the server obtains the navigational control screen from the payment transaction terminal.

7. The method of claim 1, wherein relaying comprises relaying the key payment events associated with the navigational control screen from the mobile device to the server, and wherein the server provides the key payment events to the UI agent on the payment transaction terminal.

8. The method of claim 1, wherein the navigational control screen further comprises a touch keyboard and a navigational widget within the navigational control screen.

9. The method of claim 1, further comprising:
providing user touch inputs on the display of the mobile device to complete processing of the payment transaction on the payment transaction terminal using the navigational control screen without the user touching the transaction display.

10. The method of claim 1, further comprising:
processing the method as a mobile application executed on the mobile device.

11. The method of claim 1, further comprising:
processing the method through web pages of a browser that executes on the mobile device.

12. The method of claim 1, further comprising:
updating, by relaying the key payment events to the transaction interface, transaction information presented on the transaction screens during the payment transaction.

* * * * *